US009785954B2

(12) United States Patent
Wu et al.

(10) Patent No.: US 9,785,954 B2
(45) Date of Patent: Oct. 10, 2017

(54) GENERATING RECOMMENDED ITEMS IN UNFAMILIAR DOMAIN

(75) Inventors: Xian Wu, Beijing (CN); Quan Yuan, Beijing (CN); Xia Tian Zhang, Beijing (CN); Shiwan Zhao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 588 days.

(21) Appl. No.: 13/034,849

(22) Filed: Feb. 25, 2011

(65) Prior Publication Data

US 2011/0213786 A1    Sep. 1, 2011

(30) Foreign Application Priority Data

Feb. 26, 2010    (CN) .......................... 2010 1 0116808

(51) Int. Cl.
G06F 17/30    (2006.01)
G06Q 30/02    (2012.01)

(52) U.S. Cl.
CPC ....... *G06Q 30/02* (2013.01); *G06F 17/30699* (2013.01)

(58) Field of Classification Search
None
See application file for complete search history.

(56) References Cited

U.S. PATENT DOCUMENTS

| 5,872,850 | A | * | 2/1999 | Klein | ............... G06Q 30/06 705/51 |
| 6,064,980 | A | * | 5/2000 | Jacobi et al. | ................ 705/26.7 |
| 6,092,049 | A | * | 7/2000 | Chislenko | ......... G06F 17/30699 705/7.29 |
| 6,266,649 | B1 | * | 7/2001 | Linden et al. | ............... 705/7.29 |
| 6,321,049 | B1 | | 11/2001 | Endoh | |
| 6,321,179 | B1 | | 11/2001 | Glance | |
| 7,386,547 | B2 | * | 6/2008 | Grasso et al. | |

(Continued)

FOREIGN PATENT DOCUMENTS

| EP | 1065607 A2 | 1/2001 |
| WO | WO 98/33135 B1 | 7/1998 |

OTHER PUBLICATIONS

T.H. Roh et al., "A Cluster-indexing CBR Model for Collaborative Filtering Recommendation," 7th Pacific Asia Conference on Information Systems. Jul. 10-13, 2003, Adelaide, South Australia, pp. 150-167, available at http://www.pacis-net.org/file/2003/papers/e-business/87.pdf.

(Continued)

*Primary Examiner* — Ashish K Thomas
*Assistant Examiner* — Mellissa M Ohba
(74) *Attorney, Agent, or Firm* — Cantor Colburn LLP

(57) ABSTRACT

A method of generating recommended items for a current user in an unfamiliar domain includes selecting a reference user in a reference domain different from the unfamiliar domain, where current user behavior in the reference domain and reference user behavior in the reference domain have a user similarity index which satisfies a user similarity index condition. The method further includes generating the recommended items in the unfamiliar domain for the current user according to history behavior data of the reference user in the unfamiliar domain.

10 Claims, 1 Drawing Sheet

(56) References Cited

U.S. PATENT DOCUMENTS

| | | | |
|---|---|---|---|
| 7,693,827 B2* | 4/2010 | Zamir | G06F 17/30867 |
| | | | 707/999.003 |
| 7,966,334 B1* | 6/2011 | Bezos | G06Q 30/06 |
| | | | 707/748 |
| 8,321,793 B1* | 11/2012 | Cotter et al. | 715/745 |
| 2001/0013009 A1* | 8/2001 | Greening et al. | 705/10 |
| 2002/0178057 A1* | 11/2002 | Bertram et al. | 705/14 |
| 2003/0149612 A1* | 8/2003 | Berghofer et al. | 705/10 |
| 2005/0256756 A1 | 11/2005 | Lam | |
| 2007/0192318 A1* | 8/2007 | Ramer et al. | 707/7 |
| 2009/0006374 A1* | 1/2009 | Kim | G06F 17/30699 |
| 2009/0037355 A1* | 2/2009 | Brave et al. | 706/45 |
| 2010/0153324 A1* | 6/2010 | Downs | |
| 2010/0169340 A1* | 7/2010 | Kenedy et al. | 707/758 |
| 2010/0268661 A1* | 10/2010 | Levy | G06Q 30/02 |
| | | | 705/347 |
| 2011/0087678 A1* | 4/2011 | Frieden et al. | 707/749 |

OTHER PUBLICATIONS

N-H Liu et al., "Adaptive Music Recommendation based on User Behavior in Time Slot," IJCSNS International Journal of Computer Science and Network Security, vol. 9 (2), Feb. 2009, pp. 219-227.
H.J. Lee et al., "Strategies for Selecting Initial Item Lists in Collaborative Filtering Recommender Systems." International Journal of Management Science, vol. 11 (3), Special Issue, Dec. 2005, pp. 137-153, available at http://koasas.kaist.ao.bitstream/10203/4489/1/2005-062.pdf.

* cited by examiner

GENERATING RECOMMENDED ITEMS IN UNFAMILIAR DOMAIN

CROSS-REFERENCE TO RELATED APPLICATIONS

This application claims priority under 35 U.S.C. §119 to Chinese Patent Application No. 201010116808.8 filed Feb. 26, 2010, the entire contents of which are incorporated herein by reference.

BACKGROUND OF THE INVENTION

Field of the Invention

The present invention relates to an information processing field, and more particularly to a method and apparatus for generating recommended items in an unfamiliar domain.

Description of Related Art

Traditional methods of generating recommended items are based on statistics of behaviors of many users, and items are recommended in a form of ranking list, best-selling list or the like. Some of those methods are described below.

U.S. Published Application No. 2005/0256756 A1 predicts a user's rating of a new item in a collaborative filtering system. The invention incorporates social network information in addition to user ratings to make recommendations. The distance between users in the social network is used to enhance the estimate of user similarities for collaborative filtering. The social network can be constructed explicitly by users or deduced implicitly from observed interaction between users.

U.S. Published Application No. 2003/0149612 A1 describes a method for rating an item within a recommendation system. In a recommendation scheme, each of a multitude of users U and each of a multitude of items I is included in a profile P(U,I) that includes ratings. Based on the similarity between a given user and the multitude of users in terms of the ratings, a subset of users is selected who have interest similar to those of the given user.

U.S. Pat. No. 6,321,049 describes a method for recommending items to users using automated collaborative filtering stores profiles of users relating ratings to items in memory. Profiles of items may also be stored in memory, the item profiles associating users with the rating given to the item by that user or inferred for the user by the system. The user profiles include additional information relating to the user or associated with the rating given to an item by the user. Item profiles are retrieved to determine which users have rated a particular item. Profiles of those users are accessed and the ratings are used to calculate similarity factors with respect to other users. The similarity factors, sometimes in connection with confidence factors, are used to select a set of neighboring users. The neighboring users are weighted based on their respective similarity factors, and a rating for an item contained in the domain is predicted. In one embodiment, items in the domain have features. In this embodiment, the values for features can be clustered, and the similarity factors incorporate assigned feature weights and feature value cluster weights. In some embodiments, item concepts are used to enhance recommendation accuracy.

U.S. Pat. No. 6,321,179 B1 describes a method of providing predicted user ratings includes calculating the accuracy of predictions based on the variance of distribution of the predicted user's rating. The system and method present and rank the results by treating the variance as a source of noise. The decision to present or not to present an item is made by sampling the probability distribution of the predicted rating and comparing the result to some user-set threshold (e.g., "show me all results that the system predicts I will score 3 or higher") or a system default value.

SUMMARY OF THE INVENTION

In view of the above, the present invention provides a method and apparatus for generating recommended items in an unfamiliar domain.

According to an aspect of the invention, a method of generating recommended items for a current user in an unfamiliar domain is provided. The steps of the method include selecting a reference user of the current user. The reference user is in a reference domain different from the unfamiliar domain. The reference user is selected based upon a user similarity index. When the behavior of the current user and the behavior of the reference user have a user similarity index satisfying condition in the reference domain, that reference user is selected. The method further includes the step of generating the recommended items in the unfamiliar domain for the current user according to history behavior data of the reference user in the unfamiliar domain.

According to another aspect of the invention, an apparatus for generating recommended items for a current user in an unfamiliar domain is provided. The apparatus includes a reference user determining module configured to select a reference user of the current user, in a reference domain different from the unfamiliar domain. The reference user is selected when the behavior of the current user and the behavior of the reference user have a user similarity index satisfying a user similarity index condition in the reference domain. The apparatus also includes a current user recommending module configured to generate the recommended items in the unfamiliar domain for the current user according to history behavior data of the reference user in the unfamiliar domain.

In a further embodiment of the invention, a domain similarity index between the reference domain and the unfamiliar domain can be further taken into consideration. If a domain similarity index between a reference domain and the unfamiliar domain is high, this shows that a user who has similar behaviors in the reference domain should also have similar behaviors in the unfamiliar domain; if a user similarity index between a reference user and the current user in the reference domain is also high, this shows that in the unfamiliar domain, the reference user should also have similar behaviors to those of the current user, so the recommended items generated for the reference user in the unfamiliar domain are likely to be an effective recommendation to the current user. In this way, even if there is little or no history behavior data of the current user in the unfamiliar domain, an effective recommendation can be made to the current user.

Other characteristics and advantages of the invention will become obvious in combination with the description of accompanying drawings, wherein the same number represents the same or similar parts in all figures

BRIEF DESCRIPTION OF THE DRAWINGS

The attached claims set forth inventive features characterizing the invention. However, the invention per se and preferred embodiments, objects, features and advantages thereof can be better understood by describing illustrative embodiments of the invention below with reference to accompanying drawings, wherein

DETAILED DESCRIPTION OF THE PREFERRED EMBODIMENTS

Figure 1:
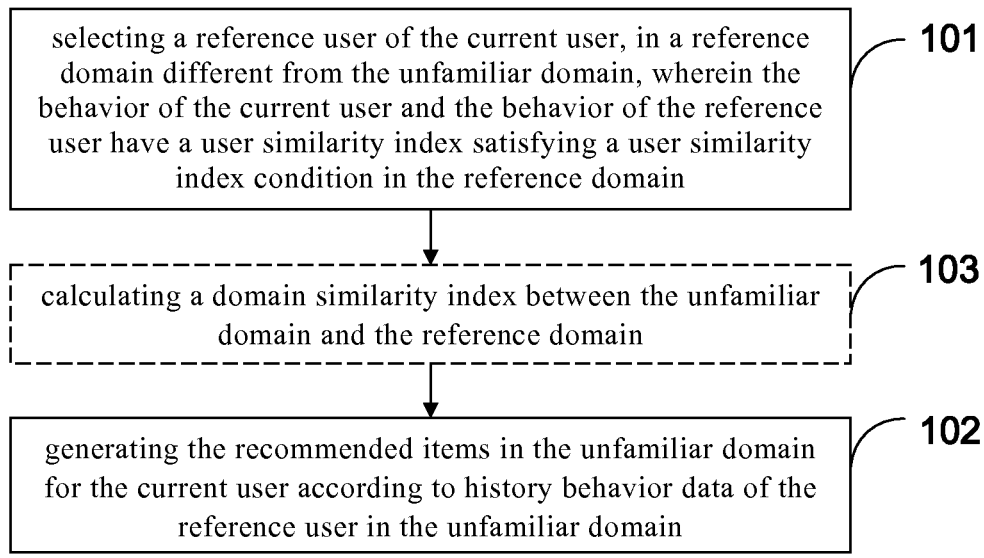
FIG. 1 is a flow chart showing a method of generating recommended items according to an embodiment of the present invention.

The embodiments of the invention are described below with reference to the accompanying drawings. In the following descriptions, more details are set forth to facilitate the understanding of the invention more comprehensively. However, those skilled in the art would appreciate that, some of the details can be eliminated from the invention and the invention is not limited to the embodiments illustrated here. In contrast, any combination of features and elements below can be used for carrying out the invention, regardless of whether or not they relate to different embodiments. Therefore, the following aspects, features, embodiments and advantages are merely used for explanation, rather than being regarded as elements of or definitions to the attached claims, unless they are explicitly indicated in the claims. It should be further noted that, in order to avoid the invention from being blurred by unnecessary details, only device structure and/or processing steps closely associated with the solution of the invention are shown in the accompanying drawings, and other details that have no close relations to the invention are neglected. Further, unless "direct" or "indirect" is deliberately used for definition, the connection in the application document includes both direct connection and indirect connection.

A traditional method of generating recommended items is based on statistics of behaviors of a lot of users, and items are recommended in a form of ranking list, best-selling list or the like. This method does not take a difference between the users into consideration. Taking a recommended item generating system of an online bookselling system for example, professional books have a limited audience, thus their sales volume is far less than that of novels. As a result professional books do not enter the best-selling list to be recommended. However, recommending novels to those users who often purchase professional books apparently is not an effective recommendation to the users. Here, effective recommendation means the recommended items are actually viewed by the user. Of course, there are many other methods in the art to measure if a recommendation is an effective recommendation.

As an improvement on the recommending method without difference, recommended items can be generated by further considering history behavior data of the user. Taking the recommended item generating system of the online bookselling system for example again, if a user purchases a book, the system can recommend to the user other books that were purchased by other users who also purchased the book. Alternatively, the system can recommend to the user other books associated with the book, according to association between the books. The association, for example, can be the same publishing house, the same author, the same keyword, or the like. The user can be classified into a user type according to history purchasing behaviors of the user, for example, a user type that often purchases travel guides, a user type that often purchases computer teaching materials, a user type that often purchases language learning materials, or the like. The system can then recommend to the user other books that were purchased by other users also belonging to the same user type. Of course, there are other further improvements.

At present, the online bookselling system sometimes is a part of an integrated online sales system. The integrated online sales system relates to many sales domains, e.g. books, audio and video products, sports equipments, clothes. If there is no or only very few history behavior data of the user in a domain to be analyzed, it is difficult to make an effective recommendation to the user. Such a domain is called an unfamiliar domain. Unfamiliar domain can be defined as needed, for example, taking a domain in which history behavior data quantity of the user is less than a threshold as an unfamiliar domain of the user. For example, for those users that mainly purchased audio/video products, sports equipment and clothes but seldom or never purchased books, book is the unfamiliar domain. When the user views books for the first time(s), the system cannot make an effective recommendation to the user by analyzing history behavior data of the user in the unfamiliar domain of book. For example, if the user never purchases a book, the system cannot recommend to the user other books that were purchased by other users who also purchased a certain book. Even if the user has purchased a few books, the user cannot be classified into a user type according to the history purchasing behaviors of the user.

Furthermore, in addition to the online sales system, a similar defect also exists in other systems that have domain classifications and recommendation requirements, e.g. search engine system. Even though the embodiments of the invention are described below by taking the online sales system for example, the idea of the invention can be applied to other systems that have domain classifications and recommendation requirements.

As shown in FIG. 1, the method of generating recommended items according to an embodiment of the invention includes a step 101 of selecting at least one reference user of the current user in at least one reference domain different from the unfamiliar domain, wherein the behavior of the current user and the behavior of the reference user have a "user similarity index" satisfying a condition in the at least one reference domain. The condition to be satisfied by the user similarity index is referred to a user similarity index condition.

According to an embodiment of the invention, users who belong to the same user type with the current user in the reference domain are regarded as reference users of the current user. If the current user corresponds to a plurality of user types in the reference domain, then all the users who belong to the user types can be regarded as reference users of the current user.

Those skilled in the art would appreciate that, users who belong to the same user type in a domain typically have similar behaviors to some extent, and thus have a user similarity index satisfying a user similarity index condition. In other word, it can be deduced that those users who belong to the same user type with the current user all have the same user similarity index satisfying the user similarity index condition.

An improvement can be made on the above method of obtaining the user similarity index. For example, the user similarity index can be obtained by making a calculation based on history behavior data rather than making a deduction from the user type, such that the user similarity index can more accurately measure a similarity between the reference users and the current user. Furthermore, the method of making a calculation based on history behavior data and the method of making a deduction from the user type can be combined for use. That is, firstly selecting those users who belong to the same user type with the current user in the reference domain as candidate reference users, then calculating a user similarity index for the candidate reference users, and finally selecting reference users according to the user similarity index.

Embodiments for calculating a user similarity index between two users in the same reference domain are described in detail below.

According to an embodiment of the invention, articles purchased by two users in common can be determined according to history behavior data of the two users in the reference domain, and then a user similarity index between the two users is calculated according to the number of the articles purchased in common. Those skilled in the art would appreciate that, for a search engine system, a user similarity index between two users can be calculated according to the number of search results clicked in common. In general, for various system that have domain classifications and recommendation requirements, common behaviors can be defined for the system. The number of common behaviors of the two users in the reference domain is determined according to history behavior data of the two users in the reference domain, and then a user similarity index between the two users is calculated according to the number of the common behaviors. That is to say, when the number of the common behaviors satisfies a common behavior number condition, the user similarity index is deemed to have satisfied the user similarity index condition.

The number can directly serve as the user similarity index. For example, if a user A and a user B purchase 3 articles in common, then the user similarity index can be 3. A ratio of the number of the articles purchased in common to a total number of the articles purchased by the two users can also serve as the user similarity index. For example, if the user A purchases 7 articles and the user B purchase 8 articles, wherein there are 3 identical articles and the total number of the articles purchased by the user A and the user B is 12, then the user similarity index can be 0.25. Apparently, a higher similarity index means that the two users purchase many identical articles, i.e. their behaviors are similar to each other.

The user similarity index between the two users can be calculated by calculating an irrelevancy index of vectors for the purchased articles. For example, if the current user purchases an article A, an article B, an article C and an article D, the user A purchases the article A, the article B, an article E and an article F, and the user B purchases the article A, the article C, the article D and the article F. The vector for the articles purchased by the current user can be represented by {1, 1, 1, 1, 0, 0}, wherein the first four 1s represent that the user purchases the article A, the article B, the article C and the article D, and the following two 0s represent that the current user does not purchase the article E and the article F; similarly, the vector for the articles purchased by the user A can be represented by {1, 1, 0, 0, 1, 1}, and the vector for the articles purchased by the user B can be represented by {1, 0, 1, 1, 0, 1}. Assuming that an irrelevancy index between the vector X for the purchased articles and the vector Y for the purchased articles is defined as:

$$\frac{\sqrt{\sum_{n=1}^{N}(X_n - Y_n)^2}}{N}$$

where Xi and Yi are respective elements in the vector, and N is a dimension of the vector, i.e. the total number of the purchased articles.

Then, the irrelevancy index between the vector for the articles purchased by the current user and the vector for the articles purchased by the user A is 1/5, i.e., $$\frac{\sqrt{(1-1)^2 + (1-1)^2 + (1-0)^2 + (1-0)^2 + (0-1)^2 + (0-1)^2}}{6}.$$

The irrelevancy index between the vector for the articles purchased by the current user and the vector for the articles purchased by the user B is $\sqrt{2}/6$, i.e., $$\frac{\sqrt{(1-1)^2 + (1-0)^2 + (1-1)^2 + (1-1)^2 + (0-0)^2 + (0-1)^2}}{6}.$$

Therefore, the irrelevancy index between the vector for the articles purchased by the current user and the vector for the articles purchased by the user B is smaller, so the user similarity index between the user B and the current user is higher. Other methods of calculating the irrelevancy index between the vectors for the purchased articles can be used.

According to another embodiment of the invention, scores for the purchased identical articles by the two users can be determined based on the history behavior data, then the user similarity index can be more accurately calculated through the scores. Those skilled in the art would appreciate that, for the search engine system, scores for clicked search results in common by the two users can be determined. In general, for various systems that have domain classifications and recommendation requirements, scores for common behaviors in the reference domain by the two users can be determined, and then the user similarity index between the two users can be more accurately calculated through the scores. That is to say, when the scores for the common behaviors satisfy a common behavior score condition, the user similarity index is deemed to have satisfied the user similarity index condition.

The method based on scores for common behaviors and the method based on the number of common behaviors can either be combined with each other for use or be used separately.

A statistic such as average and variance of the scores for the identical articles purchased by the two users can be calculated respectively. If the statistic is close to each other, then the user similarity index is likely to be high. Various methods to quantitatively calculate the user similarity index from the statistic can be defined.

A relevancy index between score vectors can be calculated. Assuming that the current user, the user A and the user B each purchase 3 articles, the current user gives scores of 5, 3, 4 for the 3 articles respectively, the user A gives scores of 3, 4, 2 for the 3 articles respectively, and the user B gives scores of 3, 1, 2 for the 3 articles respectively. Furthermore, assuming that a relevancy index between a score vector P and a score vector Q is defined as:

$$\frac{\sum_{m=1}^{M}(P_m - \overline{P})(Q_m - \overline{Q})}{\sqrt{\sum_{m=1}^{M}(P_m - \overline{P})^2}\sqrt{\sum_{m=1}^{M}(Q_m - \overline{Q})^2}},$$

where Pm and Qm are respective elements in the vectors, i.e. scores, M is a dimension of the vector, i.e. the number of the articles purchased in common, $\overline{P}$ is an average of the elements in the vector P, and $\overline{Q}$ is an average of the elements in the vector Q.

Then, the relevancy index between the score vector of the current user and the score vector of the user A is:

$$\frac{(5-4)(3-3) + (3-4)(4-3) + (4-4)(2-3)}{\sqrt{(5-4)^2 + (3-4)^2 + (4-4)^2}\sqrt{(3-3)^2 + (4-3)^2 + (2-3)^2}} = -\frac{1}{2}$$

The relevancy index between the score vector of the current user and the score vector of the user B is:

$$\frac{(5-4)(3-2) + (3-4)(1-2) + (4-4)(2-2)}{\sqrt{(5-4)^2 + (3-4)^2 + (4-4)^2}\sqrt{(3-2)^2 + (1-2)^2 + (2-2)^2}} = \frac{1}{2}$$

That is to say, viewed from the relevancy index between the score vectors, the user similarity index between the current user and the user B is higher, which can be visually seen from the scores of the current user, the user A and the user B for the 3 articles. That is, the tendency of the scores of the current user and the user B for the 3 articles is the same, i.e. the first article has the highest score and the second article has the lowest score.

The method further includes a step 102 of generating recommended items in the unfamiliar domain for the current user according to history behavior data of the reference user in the unfamiliar domain.

Since the reference user has similar behaviors to those of the current user in the reference domain, it is very likely that the reference user has similar behaviors to those of the current user in the unfamiliar domain, so recommended items generated in the unfamiliar domain for the current user with reference to the history behavior data of the reference user in the unfamiliar domain are likely to be an effective recommendation to the user.

As a simple example, assuming that in the unfamiliar domain, the user A purchases the article A, the article B, the article C and the article D, the user B purchases the article A, the article B, the article E and the article F, and the user C purchases the article A, the article C, the article D and the article F. Moreover, the user similarity index between the user A and the current user is 0.5, the user similarity index between the user B and the current user is 0.9, and the user similarity index between the user C and the current user is 0.3.

According to an embodiment of the invention, a weight of the reference user can be calculated from the user similarity index corresponding to the reference user, then recommended items provided to the current user in the unfamiliar domain are generated according to the history behavior data in the unfamiliar domain of the reference user whose weight satisfies a reference user weight condition. For example, the user similarity index can directly serve as the weight of the reference user and being the top weight serves as the reference user weight condition. In other word, recommended items provided to the current user in the unfamiliar domain are generated according to the history behavior data in the unfamiliar domain of the reference user who has the highest user similarity index with respect to the current user. In the above example, the user B has the highest user similarity index, so the article A, the article B, the article E and the article F are recommended to the current user.

Alternatively, articles purchased by the reference user in the unfamiliar domain can serve as candidate recommended items, and weights of the candidate recommended items are calculated from the user similarity indexes corresponding to the candidate recommended items, then those candidate recommended items whose weights satisfy a candidate recommended item weight condition serve as recommended items in the unfamiliar domain for the current user. Since the candidate recommended items are generated with respect to the reference user, the user similarity index corresponding to the recommended item is the user similarity index corresponding to the reference user. According to a calculation method, in the above example, weights of the candidate recommended items respectively are:

| Candidate recommended items | Weights |
|---|---|
| A | 0.5 + 0.9 + 0.3 = 1.7 |
| B | 0.5 + 0.9 = 1.4 |
| C | 0.5 + 0.3 = 0.8 |
| D | 0.5 + 0.3 = 0.8 |
| E | 0.9 |
| F | 0.9 + 0.3 = 1.2 |

Therefore, if the candidate recommended item weight condition is top 4 of the weights, then the recommended items in the unfamiliar domain for the current user are: the article A, the article B, the article F and the article E.

Sometimes a difference in the user similarity index of the reference user is not taken into consideration. For example, when those users who belong to the same user type with the current user in the reference domain all are chosen to be reference users. This is equivalent to that all the reference users have the same user similarity index while calculating the weight. Thus, this example still falls into the scope of calculating the weight according to the user similarity index.

In the above description, only one reference domain is considered. In practical applications, there exist two or more reference domains, and the two or more reference domains have different reference values for the unfamiliar domain. For example, two users having similar behaviors in the reference domain of audio and video products can have similar behaviors in the unfamiliar domain of book, but two users having similar behaviors in the reference domain of clothes can not have similar behaviors in the unfamiliar domain of book.

A simple way is not to take a difference in the reference values of the reference domains to the unfamiliar domain into consideration. That is to say, reference users found in the domain of audio and video products and reference users found in the domain of clothes are treated the same, which is equivalent to combining other domains than the unfamiliar domain into a single reference domain.

By calculating a domain similarity index between the reference domains and the unfamiliar domain, the reference domains that have different reference values to the unfamiliar domain can be distinguished from each other. According to an embodiment of the invention, the domain similarity index between two domains, i.e. domain i and domain j, can be calculated according to history behavior data of a demarcated user in the two domains (see step 103). None of the two domains is an unfamiliar domain to the demarcated user. The demarcated user can be a reference user of the current user selected in the step 101, or not.

It is possible that only one demarcated user is selected. It is determined how many common similar users there are according to the above-mentioned method, wherein the common similar user is not only a similar user of the demarcated user in the domain i, but also a similar user of the demarcated user in the domain j. The behavior of the similar user of the demarcated user in a domain and the behavior of the demarcated user in the domain have a user similarity index satisfying a certain condition. The method of calculating the user similarity index of the similar user and the condition can be the same or different as the method of calculating the user similar index of the reference user and the condition.

Next, a user similarity index between two domains is calculated according to the number of common similar users. The number can directly serve as the domain similarity index, for example, if there are 3 common similar users, the domain similarity index can be 3. A ratio of the number of common similar users to the total number of similar users in the two domains can also serve as the domain similarity index. For example, if the demarcated user has 7 similar users in the domain i and 8 similar users in the domain j, wherein there are 3 common similar users and the total number of the similar users of the demarcated user in the two domains is 12, then the domain similarity index can be 0.25. Apparently, if the index is larger, this shows that a user that is similar in the domain i is also similar in the domain j, or vice versa.

Two demarcated users can be chosen. A user similarity index in the domain i and a user similarity index in the domain j of the two demarcated users are respectively calculated first. Let the user similarity index of the two demarcated users in the domain i be UserSimi, and let the user similarity index of the two demarcated users in the domain j be UserSimj. Then the domain similarity index is calculated according to the user similarity indexes of the two demarcated users. For example, if the two users that have similar behaviors in the domain i have lower similarity in the domain j, then a difference between UserSimi and UserSimj is larger, and the domain similarity index is smaller.

In practical applications, sometimes a great number of demarcated users can be found. The domain similarity index that is calculated by taking a great number of demarcated users into consideration can more accurately reflect reference values between the domains.

According to an embodiment of the invention, user similarity indexes between two of a group of demarcated users can be respectively calculated in the domain i and the domain j, and then a statistic such as average and variance of the user similarity indexes between two of a group of demarcated users in the two domains is calculated respectively. If the statistic is close to each other, then the user similarity index is very high. Other various methods of calculating the domain similarity index quantitatively from the statistic can be designed.

According to another embodiment of the invention, the following equation can be used for calculating the domain similarity index from the user similarity index of the demarcated user.

$$DomainSim_{i,j} = \frac{\sum_{1 \leq x \leq T, 1 \leq y \leq T, x \neq y}(UserSim_{i,x,y} - \overline{UserSim_i})(UserSim_{j,x,y} - \overline{UserSim_j})}{\sqrt{\sum_{1 \leq x \leq T, 1 \leq y \leq T, x \neq y}(UserSim_{i,x,y} - \overline{UserSim_i})^2}\sqrt{\sum_{1 \leq x \leq T, 1 \leq y \leq T, x \neq y}(UserSim_{j,x,y} - \overline{UserSim_j})^2}}$$

where T is the number of the demarcated users, $UserSim_{i,x,y}$ represents the user similarity index between the demarcated user x and the demarcated user y in the domain i, and $\overline{UserSim_i}$ represents an average of each of the user similarity indexes in the domain i.

According to a further embodiment of the invention, the following equation can be used for calculating the domain similarity index from the user similarity index of the demarcated users.

$$DomainSim_{i,j} = 1 \Big/ \sqrt{\sum_{1 \leq x \leq T, 1 \leq y \leq T, x \neq y}(UserSim_{i,x,y} - UserSim_{j,x,y})^2}$$

Those skilled in the art would appreciate that, this in fact calculates a distance between two user similarity index vectors respectively corresponding to the domain i and the domain j. The larger the distance is, the smaller the domain similarity index is. Each element in the user similarity index vector is the user similarity index of the two demarcated users in the domain. The domain of the vector is $C_T^2$.

After respectively obtaining the domain similarity indexes between the unfamiliar domain and each of the reference domains, recommended items in the unfamiliar domain can be generated for the current user by taking the user similarity index and the domain similarity index into comprehensive consideration. Logically, if the domain similar index between a reference domain and the unfamiliar domain is high, this shows that a user who has similar behaviors in the reference domain should also have similar behaviors in the unfamiliar domain; if the user similarity index between a reference user and the current user in the reference domain is also high, then the reference user and the current user should also have similar behaviors in the unfamiliar domain, so the recommended items that are generated in the unfamiliar domain according to the history behavior data of the reference user are likely to be an effective recommendation for the current user.

As a simple example, assuming that in the unfamiliar domain, the user A purchases the article A, the article B, the article C and the article D, the user B purchases the article A, the article B, the article E and the article F, and the user C purchases the article A, the article C, the article D and the article F. Moreover, the user A and the user B are reference users found in the first reference domain for the current user, the user similarity index between the user A and the current user is 0.5, the user similarity index between the user B and the current user is 0.9, the domain similarity index between the first reference domain and the unfamiliar domain is 0.2; the user C is a reference user that is found in the second reference domain for the current user, the user similarity index between the user C and the current user is 0.3, and the domain similarity index between the second reference domain and the unfamiliar domain is 0.7.

In a quantitative calculation, a weight of the reference user can be calculated from the domain similarity index and the user similarity index corresponding to the reference user, and then recommended items provided to the current user in the unfamiliar domain are generated according to the history behavior data in the unfamiliar domain of the reference user whose weight satisfies the reference user weight condition. Since the reference user is chosen according to the history behavior data in the reference domain, the domain similarity index corresponding to the reference user is the domain similarity index between the reference domain and the unfamiliar domain. According to a calculation method, in the above example, the weights of the reference users are as follows:

| Reference user | Weights |
|---|---|
| 1 | 0.5 * 0.2 = 0.1 |
| 2 | 0.9 * 0.2 = 0.18 |
| 3 | 0.3 * 0.7 = 0.21 |

In this way, if the reference user weight condition is top one, then the article A, the article C, the article D and the article F can directly serve as the recommended items for the current user in the unfamiliar domain.

Alternatively, articles purchased by the reference user in the unfamiliar domain can serve as candidate recommended items, and weights of the candidate recommended items are calculated from the user similarity indexes and domain similarity indexes corresponding to the candidate recommended items, then those candidate recommended items whose weights satisfy the candidate recommended item weight condition serve as the recommended items for the current user in the unfamiliar domain. Since the candidate recommended item is generated with respect to the reference user, the user similarity index corresponding to the candidate recommended item is the user similarity index corresponding to the reference user, and the domain similarity index corresponding to the candidate recommended item is the domain similarity index corresponding to the reference user. According to a calculation method, in the above example, weights of the candidate recommended items respectively are:

| Candidate recommended items | Weights |
|---|---|
| A | 0.5 * 0.2 + 0.9 * 0.2 + 0.3 * 0.7 = 0.49 |
| B | 0.5 * 0.2 + 0.9 * 0.2 = 0.28 |
| C | 0.5 * 0.2 + 0.3 * 0.7 = 0.31 |
| D | 0.5 * 0.2 + 0.3 * 0.7 = 0.31 |
| E | 0.9 * 0.2 = 0.18 |
| F | 0.9 * 0.2 + 0.3 * 0.7 = 0.39 |

Therefore, if the candidate recommended item weight condition is top 4 of the weights, then the recommended items for the current user in the unfamiliar domain are: the article A, the article F and the article C/D.

If only one of the user similarity index and the domain similarity index is considered while calculating the weight, this means that the other one is a constant. If only the user similarity index is considered, this means that the domain similarity index between all the reference domains and the unfamiliar domain is the same value; if only the domain similarity index is considered, this means that the user similarity index between all the reference users and the current user is the same value. Therefore, the above situations still fall into the scope of calculating the weights according to the user similarity index and the domain similarity index.

Those skilled in the art could also design other methods that rank the recommended items generated in the unfamiliar domain for the reference users by using both the domain similarity index and the user similarity index, and generate recommended items for the current user in the unfamiliar domain.

Figure 2:
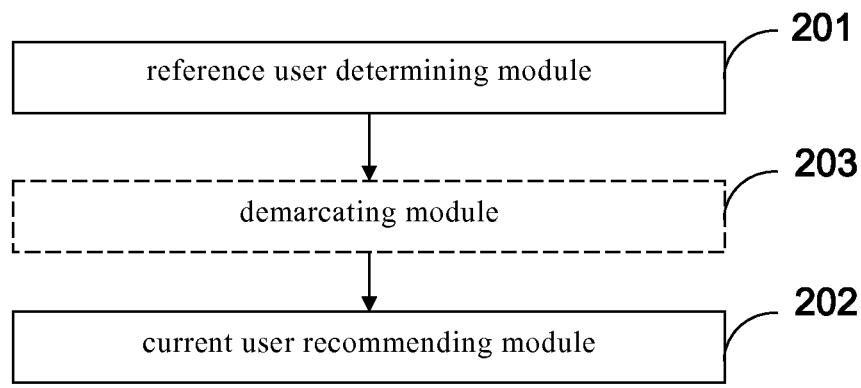
FIG. 2 is a block diagram showing an apparatus for generating recommended items according to an embodiment of the present invention.

As shown in FIG. 2, the apparatus for generating recommended items according to an embodiment of the invention includes:

a reference user determining module 201 configured to select a reference user of the current user, in a reference domain different from the unfamiliar domain, wherein the behavior of the current user and the behavior of the reference user have a user similarity index satisfying a user similarity index condition in the reference domain; and a current user recommending module 202 configured to generate the recommended items in the unfamiliar domain for the current user according to history behavior data of the reference user in the unfamiliar domain.

The apparatus further includes a demarcating module 203 configured to determine a domain similarity index between the unfamiliar domain and the reference domain according to the history behavior data of a demarcated user in the unfamiliar domain and the reference domain.

The above method and system can be implemented by computer executable instructions and/or control codes included in the processor, for example, such codes are provided on a carrier medium such as magnetic disk, CD or DVD-ROM, a programmable memory such as read only memory (firmware), or a data carrier such as optical or electronic signal data carrier. The apparatus for processing information of the embodiments and components thereof can be realized by hardware circuits such as large scale integrated circuit or gate array, semiconductor such as logic chip or transistor, or programmable hardware device such as field programmable gate array and programmable logic device, or by software executed by various kinds of processors, or by the combination of the hardware circuits and software (e.g. firmware).

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadcast interpretation so as to encompass all such modifications and equivalent structures and functions.

That which is claimed is:

1. A method of generating recommended items for a current user in an unfamiliar domain, comprising:

selecting a plurality of candidate reference users sharing a user type with the current user in a reference domain, wherein the reference domain differs from the unfamiliar domain;

calculating a plurality of user similarity indices for the plurality of candidate reference users, comprising calculating a user similarity index for a candidate reference user with respect to a reference domain and the current user, wherein the user similarity index is based at least in part on common behaviors between the current user and the candidate reference user in the reference domain, and is calculated according to history behavior data of a plurality of demarcated users in the unfamiliar domain and the reference domain, wherein the plurality of demarcated users are similar users in two or more domains that are different than the current user;

selecting the candidate reference user as a reference user in the reference domain, responsive to the user similarity index of the candidate reference user satisfying a user similarity index condition;

determining a domain similarity index between the unfamiliar domain and the reference domain, wherein the domain similarity index is distinct from the user similarity index, and wherein the domain similarity index indicates a degree of similarity between the unfamiliar domain and the reference domain;

calculating a user weight for the reference user with respect to the current user, wherein the user weight is calculated by multiplying the user similarity index by the domain similarity index;

generating two or more candidate items in the unfamiliar domain for the current user according to history behavior data of other users, comprising at least the reference user, in the unfamiliar domain;

assigning an item weight to each of the two or more candidate items, wherein for each of the two or more candidate items, the item weight assigned is calculated by adding the user weights of the other users who are associated with the candidate item; and selecting, as the recommended items, a subset of the candidate items whose item weights meet an item weight condition.

2. The method according to claim 1, wherein the reference user in the reference domain has a number of behaviors common to the current user in the reference domain such that a common behavior number condition is satisfied.

3. The method according to claim 1, wherein the reference user has a score for behaviors common to the current user in the reference domain, and wherein the score satisfies a common behavior score condition in the reference domain.

4. The method according to claim 1, wherein determining the domain similarity index between the unfamiliar domain and the reference domain is at least partially based on history behavior data of a demarcated user in the unfamiliar domain and history behavior data of a demarcated user in the reference domain, wherein none of the unfamiliar domain and the reference domain is an unfamiliar domain for the demarcated user.

5. The method according to claim 1, wherein calculating the user similarity index for the reference user with respect to the reference domain and the current user comprises:

determining a current purchase vector for the current user, wherein each element of the current purchase vector corresponds to a purchasable item, and wherein the value of each element in the current purchase vector indicates whether the current user has purchased the purchasable item corresponding to the element;

determining a reference purchase vector for the reference user, wherein each element of the reference purchase vector corresponds to a purchasable item, and wherein the value of each element in the reference purchase vector indicates whether the reference user has purchased the purchasable item corresponding to the element; and calculating an irrelevancy index based on a sum of the squares of the differences between the elements of the current purchase vector and the reference purchase vector;

wherein the user similarity index is based at least in part on the irrelevancy index.

6. An apparatus for generating recommended items for a current user in an unfamiliar domain, comprising:

a reference user determining module configured to:

select a plurality of candidate reference users sharing a user type with the current user in a reference domain, wherein the reference domain differs from the unfamiliar domain;

calculate a plurality of user similarity indices for the plurality of candidate reference users, comprising calculating a user similarity index for a candidate reference user with respect to a reference domain and the current user, wherein the user similarity index is based at least in part on common behaviors between the current user and the candidate reference user in the reference domain, and is calculated according to history behavior data of a plurality of demarcated users in the unfamiliar domain and the reference domain, wherein the plurality of demarcated users are similar users in two or more domains that are different than the current user; and select the candidate reference user as a reference user in the reference domain, responsive to the user similarity index of the candidate reference user satisfying a user similarity index condition;

a domain similarity determining module configured to determine a domain similarity index between the unfamiliar domain and the reference domain, wherein the domain similarity index is distinct from the user similarity index, and wherein the domain similarity index indicates a degree of similarity between the unfamiliar domain and the reference domain; and one or more computer processors configured to:

calculate a user weight for the reference user with respect to the current user, wherein the user weight is calculated by multiplying the user similarity index by the domain similarity index;

generate two or more candidate items in the unfamiliar domain for the current user according to history behavior data of other users, comprising at least the reference user, in the unfamiliar domain;

assign an item weight to each of the two or more candidate items, wherein for each of the two or more candidate items, the item weight assigned is calculated by adding the user weights of the other users who are associated with the candidate item; and select, as the recommended items, a subset of the candidate items whose item weights meet an item weight condition.

7. The apparatus according to claim 6, wherein the reference user has a number of behaviors common to the current user that satisfies a common behavior number condition in the reference domain.

8. The apparatus according to claim 6, wherein the reference user has scores for behaviors common to the current user that satisfy a common behavior score condition in the reference domain.

9. The apparatus according to claim 6, further comprising:

a demarcating module configured to determine the domain similarity index between the unfamiliar domain and the reference domain according to history behavior data of a demarcated user in the unfamiliar domain and the reference domain, wherein none of the unfamiliar domain and the reference domain is an unfamiliar domain for the demarcated user.

10. The apparatus according to claim 6, wherein the reference user determining module is further configured to:
   determine a current purchase vector for the current user, wherein each element of the current purchase vector corresponds to a purchasable item, and wherein the value of each element in the current purchase vector indicates whether the current user has purchased the purchasable item corresponding to the element;
   determine a reference purchase vector for the reference user, wherein each element of the reference purchase vector corresponds to a purchasable item, and wherein the value of each element in the reference purchase vector indicates whether the reference user has purchased the purchasable item corresponding to the element; and
   calculate an irrelevancy index based on a sum of the squares of the differences between the elements of the current purchase vector and the reference purchase vector;
   wherein the user similarity index is based at least in part on the irrelevancy index.

* * * * *